March 6, 1962
W. R. KLAPPER
3,024,223
LATEX COAGULATION TECHNIQUE
Filed Oct. 12, 1959
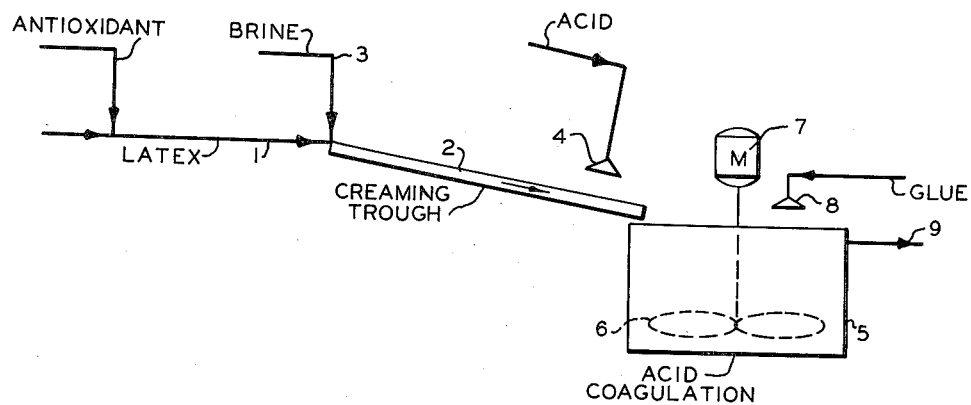
INVENTOR.
W. R. KLAPPER
BY
*Hudson & Young*
ATTORNEYS United States Patent Office 3,024,223
Patented Mar. 6, 1962

3,024,223
LATEX COAGULATION TECHNIQUE
William R. Klapper, Borger, Tex., assignor to Phillips Petroleum Company, a corporation of Delaware
Filed Oct. 12, 1959, Ser. No. 845,981
4 Claims. (Cl. 260—85.1)

This invention relates to the coagulation of a latex. In one of its aspects, the invention relates to the coagulation of a rubber containing latex using a combination of brine, glue and acid. In another of its aspects, the invention relates to the coagulation of a latex, for example, a butadiene-styrene copolymer containing latex obtained by a conventional emulsion polymerization technique, by adjusting the ratio of glue to brine, which are added to effect coagulation, using, in effect, a combination of both the brine-acid and glue-acid coagulation techniques which are now known in the art. In a further aspect of the invention, it relates to a technique as described modified by control of pH to a lower value as salt concentration is increased. In a still further aspect of the invention, it relates to a combination of techniques as described in which a low salt concentration is maintained in the coagulation zone, the brine being used principally to cause creaming and the glue being adjusted to control crumb size, permitting use of the glue as an accelerator of the cure rate and also permitting, advantageously, to obtain desired modulus of the rubber product with greatly reduced use of such agents as sodium dibutyl dithiocarbamate, usually added to increase modulus, and in some cases with complete elimination of such agent.

The preparation of synthetic rubber latices is old and well known. It is known to use an acid which is added to a latex which contains soap, as is known, so that the free fatty acid which corresponds to the soap will be liberated. This is done best, usually, when the latex contains a salt of an alkali metal, e.g., sodium chloride. It is also known to add a hydrophilic colloid, such as glue, to a latex to aid in creaming and coagulating to obtain non-coherent rubber crumbs which can be readily filtered, washed and dried. When glue has been used, it has been used with an acid.

In one method, producing a copolymer of butadiene and styrene, the latex has been creamed by mixing brine with the latex following which acid has been sprayed on the creamed latex as it has been flowed in a trough to an acid coagulation tank. Rubber thus produced was found not to cure sufficiently rapidly as measured by determining the modulus of the rubber after various periods of curing. Thus, the increases in modulus during the periods of curing occurred too slowly.

It was found that, if a low concentration of brine was maintained in the latex, which was then creamed in a mixing trough, whereupon sulfuric acid was sprayed onto the surface of the creamed fluid passing through the trough to the acid coagulation tank to which aqueous glue solution was continuously added and from which coagulated rubber was continuously overflowed, that by varying the concentration of brine and glue, added to the latex undergoing processing, there could be obtained a variation in the curing rate of the rubber so produced to obtain desirable curing rates even without addition of such an agent as sodium dibutyl dithiocarbamate, used in the process here described.

Generally, it was found that, as the brine level of concentration was increased, there could be a corresponding decrease in the glue and vice versa. When modulus values were observed to fall below a desired standard value, coagulation instructions could be altered to specify a decrease in brine and a corresponding increase in glue with resulting increase in moduli values. Increased control of crumb size is obtained with increased glue. The pH of the fluids in the coagulation tank at this time is generally in the range 2–5 and the salt concentration in said tank is in the range 2–5 percent. The amount of the glue used is then varied to control crumb size and modulus.

An object of this invention is to provide a method of coagulating a latex containing a synthetic rubber. Another object of the invention is to provide a process for the coagulation of a latex in a manner to control the modulus of the final rubber product. Another object of the invention is to control the crumb size. Another object of the invention is to substantially reduce and, in some cases, entirely eliminate the use of agents ordinarily used to increase modulus. Another object of the invention is to provide a process for the coagulation of various latices in a manner so as to control properties of the ultimate rubber product, facilitating processing of the latex being treated and the crumb obtained, and to render more economical the operations involved in producing a rubber.

Other aspects, objects and the several advantages of the invention are apparent from a study of this specification, the drawing and the appended claims.

According to the present invention, a latex containing a synthetic rubber is coagulated using a brine, an acid and a glue.

Still, according to the invention, the concentrations of the brine, acid, and glue, as well as their relative proportions, especially that of the brine and glue, are adjusted to obtain better modulus, in the absence of an agent giving an increased modulus, or to reduce the amount of such agent if one is used.

Generally, the salt concentration in the coagulation zone will be as already stated. However, a salt concentration substantially below 2 percent is not now preferred. Usually, a lowering of the salt concentration will require a lowering of the pH in the coagulation zone. The glue solution will be in the range .1–.4 percent by weight but this is subject to variation in some cases. In any event, the amount of the glue solution used can be determined in each case by routine testing to obtain a desired control of crumb size and a desired modulus value of the finished rubber. The remaining properties of the rubber obtained according to the invention are also good; indeed, the overall rubber is very desirable. Latex which contained 17 percent solids was coagulated by the brine-acid-glue method at a rate of 40 g.p.m. Anti-oxidant in the amount of 1.06 percent of the solids in the latex was added to the latex. An 8 percent solution of brine, 0.05 percent aqueous $H_2SO_4$, and a 3 percent aqueous solution of glue were added to the latex. The brine solution was added at a rate to maintain about 2.7 percent NaCl in the coagulation tank. The acid solution was added to maintain a pH of 2.67 in the coagulation tank. The glue was added in the amount of about 0.25 percent of all constituents added to the coagulation tank. The rate of addition of glue was regulated to produce particles of coagulated latex that could easily be processed and to increase the modulus of the finished rubber.

Latex, brine and acid from the same source as in the coagulation by the glue-acid-brine method was coagulated at the same rate by the acid-brine method. The same concentration of short stop was used and in addition sodium dibutyl dithiocarbamate was used to the extent 0.15 percent of the weight of the solids in the latex. The latex was coagulated at a rate of 40 g.p.m. The brine was added to maintain 4.79 percent NaCl in the coagulation tank. The acid was added to maintain a pH of 4.34 in the coagulation tank.

The modulus obtained from the polymers in the above plant production is superior with the brine-acid-glue operation of the invention to the brine-acid operation of the prior art as evidenced by the following table.

TABLE

|  | Sample No. | Modulus | | |
|---|---|---|---|---|
|  |  | 25' | 50' | 100' |
| Brine-acid | 1 | 380 | 800 | 1,310 |
|  | 2 | 400 | 810 | 1,300 |
|  | 3 | 360 | 760 | 1,250 |
| Average |  | 380 | 790 | 1,287 |
| Brine-acid-glue | 4 | 530 | 970 | 1,450 |
|  | 5 | 540 | 920 | 1,470 |
| Average |  | 535 | 945 | 1,460 |

It will be noted from the table that the modulus average increased from 1287 to 1460, i.e., in excess of 13.4 percent. The above tabular data were obtained using the following recipe:

Polymerization temperature, ° F _____ 117
Parts by weight:
    Butadiene _____ 70.5
    Styrene _____ 29.5
    Water _____ 180.0
    Potassium soap _____ 4.0
    Potassium persulfate catalyst _____ .3
    Modifier _____ Variable
    Caustic potash _____ .667
    Shortstop (M-carbamate polysulfide) _____ .077

The monomeric material which can be polymerized to produce latices which can be coagulated by the process of this invention comprises unsaturated organic compounds which generally contain the characteristic structure $CH_2=C<$ and, in most cases, have at least one of the disconnected valences attached to an electronegative group, that is, a group which increases the polar character of the molecule such as a chlorine group or an organic group containing a double or triple bond such as vinyl, phenyl, cyano, carboxy, or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like, aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinyl acetate, vinyl chloride, vinylidene chloride, vinylfurane, vinylcarbazole, vinylacetylene and other unsaturated hydrocarbons, esters, alcohols, acids, ethers, etc., of the types described.

The following recipes are given as examples of some of the types of polymerization recipes that can be used in accordance with known processes for formation of latices which may be coagulated to yield synthetic rubber, and are presented as being typical of those to which my invention is applied.

*Recipes*

| Persulfate | Iron Pyrophosphate (Redox) 4 | Polyalkylene Polyamine |
|---|---|---|
| Conjugated monomeric diene.[1] | Conjugated monomeric diene.[1] | Conjugated monomeric diene.[1] |
| Water | Water | Water. |
| $K_2S_2O_7$ | Modifier | Electrolyte (optional). |
| Modifier | Hydroperoxide | Alkali-metal hydroxide (optional). |
| Emulsifier | Emulsifier | Emulsifier. |
|  | Sugar (optional) | Modifier. |
|  | Alkali-metal pyrophosphate. | Hydroperoxide. |
|  | $FeSO_4.7H_2O$ | Chelating agent. |
| 110-130° F | 40-43° F | $FeSO_4.7H_2O$. |
| Reaction temperature. | Reaction temperature. | Sulfoxylate 40-43° F. Reaction temperature. |

[1] A conjugated diene alone or together with an unsaturated organic material copolymerizable therewith.

Emulsifying agents which are applicable in the practice of my invention are fatty acid soaps such as potassium laurate, potassium oleate, and the like. Salts of rosin acids and other emulsifying agents such as nonionic emulsifying agents, e.g., salts of alkyl aromatic sulfonic acids, salts of alkyl sulfates, and the like, which will produce favorable results under the conditions of the reaction, can also be used. The amount of emulsifier used to obtain optimum results is somewhat dependent upon the relative amounts of monomeric material and aqueous phase, the reaction temperature and the other ingredients of the polymerization mixture. Usually an amount between about 0.3 and 5 parts per 100 parts of monomeric material will be found to be sufficient.

It will be apparent to one skilled in this art that modifiers such as allyl mercaptans may be used, as can other ingredients, according to the prior art to produce latices which can be coagulated according to the novel technique of this invention.

Since it will be apparent to one skilled in the art who has studied this disclosure that the invention is of a broad character in that the specific concentrations and relative amounts or proportions of the salt or salts used, the acid or acids used, and the glue or equivalents used, can be determined by routine test in case of each different latex, it is clear that the numerical values given herein can be varied within and without the ranges thereof without departure from the scope of the invention. Thus, while certain values given are those found to be now desirable, the invention is in its broadest aspect broader than one limited to the specific values given.

Referring to the drawing, latex is passed by pipe 1 to creaming trough 2 to which brine is added by pipe 3. Near the end of trough 2, acid is sprayed onto the creamed mixture by spray means 4. The sprayed mixture passes into tank 5, stirred by stirrer 6 driven by motor 7. Glue is sprayed as an aqueous solution by spray means 8. Rubber product overflows from tank 5 by overflow pipe 9.

Although a continuous operation is now preferred, the invention can be practiced in a batch-type operation. The means and modus operandi are set forth for disclosure purposes and are not exclusively the only means and manner of embodying the invention.

The conditions and apparatus with which to prepare latices which are coagulated by the present invention do not, per se, form a part of the present invention and the reader is referred to the art for such additional information on the production of latices as may be required to produce a latex for coagulation by a process according to the invention.

Reasonable variation and modification are possible within the scope of the foregoing disclosure, drawing and the appended claims to the invention the essence of which is that the coagulation of a synthetic rubber containing latex is effected employing a salt, an acid and a glue and that the relative amounts and proportions are adjusted to obtain a reduction or elimination of the use of agents added to the latex to increase modulus of the rubber product and a control of crumb size.

I claim:

1. A method of coagulating a latex which comprises the steps of adding to the latex a brine of a concentration of about 2–5 percent adapted to the ensuing creaming of the latex, creaming the latex and brine mixture, spraying acid onto the surface of the creamed latex and then passing the final mixture thus obtained to an acid coagulation zone maintained at a pH of about 2–5 to which there is added an aqueous solution of glue in the range of about .1–.4 percent by weight of latex, and recovering coagulated rubber from said zone.

2. The coagulation of a synthetic rubber latex in a manner particularly adapted to the coagulation of a GR–S type synthetic rubber latex, which comprises first adding a low concentration of brine to the latex, creaming the latex and brine in a mixing zone, spraying acid onto the surface of the fluid in said mixing zone and then passing the mixture thus obtained to an acid coagulation tank having pH of about 2–5, feeding an aqueous solution of glue in the range of about .1–.4 percent by weight of latex continuously to said coagulation zone, removing coagulated rubber continuously from said zone by overflow from said zone and adjusting the concentration of brine and glue added to the latex being coagulated to obtain a desired curing rate of the final rubber so produced.

3. A method of coagulating a latex containing a synthetic rubber produced by polymerization of at least one organic compound containing the characteristic structure $CH_2=C<$ which comprises adjusting the pH of said latex to a value in the range 2–5, adding salt to said latex to reach a concentration of salt therein in the range 2–5 percent by weight and subsequently adding glue in a concentration of about .1–.4 percent by weight of latex during the coagulation to control crumb size and modulus of the final rubber product to a desired value.

4. A method for controlling the crumb size of a coagulated latex which comprises the steps of adding to a latex solution, a brine of a concentration of 2–5 percent so as to enable creaming of the latex, creaming of the latex and brine mixture, spraying acid onto the surface of the creamed latex and then passing the final mixture thus obtained to an acid coagulation zone maintained at a pH of 2–5 to which there is added an aqueous solution of glue in the range of about .1–.4 percent by weight of latex and recovering the coagulated rubber having a controlled crumb size.

References Cited in the file of this patent

UNITED STATES PATENTS

| | | |
|---|---|---|
| 2,487,263 | Mueller | Nov. 8, 1949 |
| 2,786,879 | Kennedy | Mar. 26, 1957 |
| 2,915,489 | White | Dec. 1, 1959 |